(No Model.)
G. W. COLE.
BICYCLE TOE CLIP.
No. 560,392. Patented May 19, 1896.
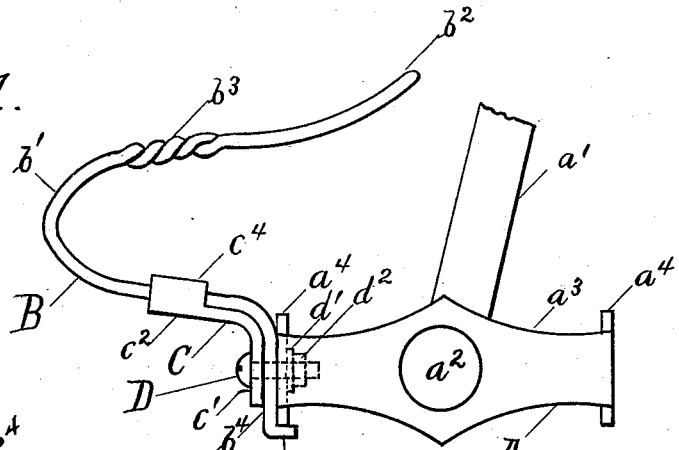
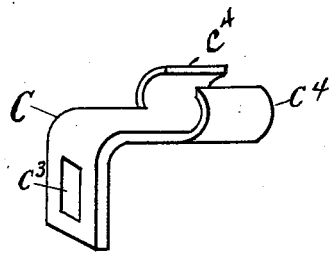
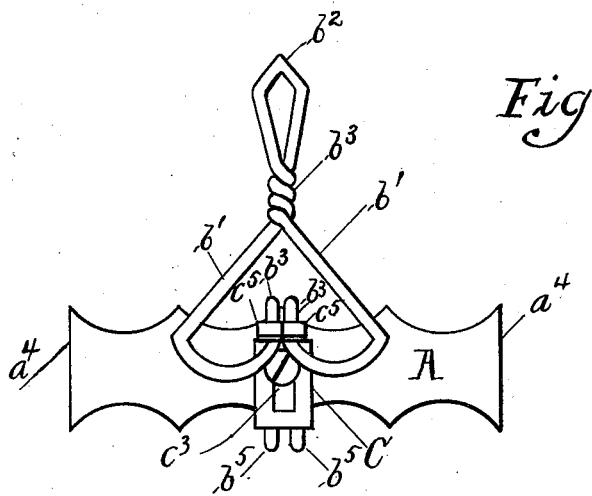
WITNESSES:
John A. Loveland.
Emma H. Finlayson.
INVENTOR
George W. Cole
BY
James L. Stewart
his ATTORNEY

UNITED STATES PATENT OFFICE.

GEORGE W. COLE, OF ASBURY PARK, NEW JERSEY.

BICYCLE TOE-CLIP.

SPECIFICATION forming part of Letters Patent No. 560,392, dated May 19, 1896.

Application filed December 3, 1895. Serial No. 570,883. (No model.)

*To all whom it may concern:*

Be it known that I, GEORGE W. COLE, a citizen of the United States, and a resident of Asbury Park, in the county of Monmouth and State of New Jersey, have invented a certain new and useful Improvement in Bicycle Toe-Clips, of which the following is a specification.

My invention relates to an improvement in what are commercially known as "toe-clips," which are used in connection with the treadles of bicycles.

I have illustrated my invention in the accompanying drawings, in which like letters refer to like parts.

Figure 1 is a side view in elevation. Fig. 2 is a front view in elevation. Fig. 3 is a detailed view of the bracket that I employ.

A is intended to represent the treadle of the bicycle, suitably journaled to a foot-crank, (indicated as $a'$.) $a^2$ represents the axle of the treadle. Such treadles usually consist of a square frame composed of the sides $a^3$ and $a^3$ and $a^4$ and $a^4$, the axle $a^2$ being journaled in the sides $a^3$ and $a^3$.

B is a bicycle toe-clip made of wire bent into the configurations illustrated. Beginning with the point $b^2$ the wire is preferably bent as indicated, forming the top or toe of the clip. Then it is twisted, as at $b^3$, and expanded, as at $b'$, to receive the toe of the shoe, and again the wires are brought together, as at $b^3$ and $b^3$, and bent downwardly, as at $b^4 b^4$, and again bent upwardly to form the lugs $b^5$ and $b^5$.

C is a bracket or brace. I have illustrated this in detail in Fig. 3. Its arms $c'$ and $c^2$ are bent nearly at right angles. The arm $c'$ is provided with the slot $c^3$, and the arm $c^2$ is provided with the flanges $c^4$ and $c^4$.

D is a bolt, and $d'$ and $d^2$ are nuts adapted to coöperate with the said bolt.

The wire toe-clip is manufactured in the usual manner, preferably by the use of a machine adapted to form the configurations indicated. The bracket C is then placed in the position indicated in Fig. 1, and the flanges $c^4$ and $c^4$ are folded over the wires which pass between the same in a manner to hold the wires firmly between such lips. The bolt D is then introduced through the slot $c^3$ and through an aperture provided for the same in the frame of the toe-clip $a^4$. The clip is then adjusted so that the lugs $b^5$ and $b^5$ make contact with the under side of the frame of the toe-clip $a^4$, and the nuts $d'$ and $d^2$ are screwed on, thus fixing the toe-clip in a permanent position.

I am aware that toe-clips have heretofore been made of wire bent into certain configurations and affixed to the treadles of bicycles; but I have observed in all such toe-clips that several difficulties have been encountered which make them impractical. One of these difficulties is that the wire has not sufficient strength to withstand the strain of the foot bearing upon the same either in its downward or upward pressure. To overcome this difficulty, I have provided the brace C, which grips the wires by the lips $c^4$ and $c^4$, and is secured to the frame of the treadle $a^4$ by the bolt D and nuts $d'$ and $d^2$. The lips $c^4$ and $c^4$ also serve to hold the wires together, obviating the necessity for the further twist of the wires, as at $b^3$, which is usual in the construction of such wire clips. The arm $c'$ of the bracket C is also provided with the slot $c^3$, for the purpose of enabling the adjustment of the clip upwardly or downwardly, as the occasion may require. I also provide the lugs $b^5$ and $b^5$ at the end of the wire to add additional strength to prevent the clip from slipping upward in the event of the screw D becoming loose.

What I claim is—

1. A bicycle toe-clip made in the configuration shown in combination with the bracket provided with the flanges $c^4$ and $c^4$, and the slot $c^3$, substantially as described.

2. A bicycle toe-clip made of wire, bent in the configuration shown, with an opening to receive the toe and lugs $b^5$ and $b^5$, in combination with the bracket having the flanges $c^4$ and $c^4$, and the slot $c^3$, substantially as described.

Signed at New York, in the county of New York and State of New York, this 27th day of November, A. D. 1895.

GEORGE W. COLE.

Witnesses:
JOHN W. LOVELAND,
EMMA W. FINLAYSON.